US012783138B2

(12) United States Patent
George et al.

(10) Patent No.: US 12,783,138 B2
(45) Date of Patent: Nov. 3, 2026

(54) METHOD AND SYSTEM FOR DATA SEGREGATION IN STORAGE DEVICES USING LONGEVITY-HINT BASED STORAGE PROTOCOLS

(71) Applicant: Samsung Electronics Co., Ltd., Suwon-si (KR)

(72) Inventors: Arun George, Bengaluru (IN); Javier Gonzalez, Copenhagen V (DK); Kanchan Joshi, Bengaluru (IN); Roshan R Nair, Bengaluru (IN)

(73) Assignee: Samsung Electronics Co., Ltd., Suwon-si (KR)

( * ) Notice: Subject to any disclaimer, the term of this patent is extended or adjusted under 35 U.S.C. 154(b) by 57 days.

(21) Appl. No.: 18/883,238

(22) Filed: Sep. 12, 2024

(65) Prior Publication Data

US 2025/0390238 A1 Dec. 25, 2025

(30) Foreign Application Priority Data

Jun. 25, 2024 (IN) ............................. 202441048594

(51) Int. Cl.
*G06F 3/06* (2006.01)

(52) U.S. Cl.
CPC .......... *G06F 3/0635* (2013.01); *G06F 3/0604* (2013.01); *G06F 3/0673* (2013.01)

(58) Field of Classification Search
CPC .... G06F 3/0635; G06F 3/0604; G06F 3/0673; G06F 3/0659; G06F 3/0616; G06F 3/0638; G06F 3/0679
USPC .................................................. 711/154, 100
See application file for complete search history.

(56) References Cited

U.S. PATENT DOCUMENTS

| | | | | |
|---|---|---|---|---|
| 10,268,584 | B2 | 4/2019 | Hahn | |
| 11,126,544 | B2 | 9/2021 | Tai et al. | |
| 11,573,893 | B2 | 2/2023 | Muthiah et al. | |
| 2013/0024609 | A1* | 1/2013 | Gorobets | G06F 3/0611 711/E12.008 |
| 2018/0088803 | A1* | 3/2018 | Zhou | G06F 3/0647 |
| 2018/0275911 | A1* | 9/2018 | Nakazumi | G06F 3/0647 |
| 2019/0377494 | A1* | 12/2019 | Rao | G06F 12/0246 |

(Continued)

OTHER PUBLICATIONS

Extended European Search Report dated Mar. 6, 2025 for corresponding European Application No. 24201858.8.

(Continued)

*Primary Examiner* — Hosain T Alam
*Assistant Examiner* — Zubair Ahmed
(74) *Attorney, Agent, or Firm* — Fish & Richardson P.C.

(57) ABSTRACT

The present disclosure provides methods include receiving an I-O from host system, determining whether an overwrite count of data of the I-O placed by the host system in a placement handle is different from an average overwrite count of data in the placement handle upon receiving the I-O, grouping one or more pages corresponding to the data of the I-O in the placement handle to another placement handle that matches the overwrite count of the data of the I-O based on the determination of the overwrite count of the data of the I-O in the placement handle being different from the average overwrite count of data in the placement handle of the storage device during an internal operation, and, updating a log page to record the grouping of the one or more pages.

12 Claims, 5 Drawing Sheets

(56) References Cited

U.S. PATENT DOCUMENTS

| | | | | |
|---|---|---|---|---|
| 2020/0278793 | A1* | 9/2020 | Jiang | G06F 3/0608 |
| 2024/0012580 | A1 | 1/2024 | Helmick et al. | |

OTHER PUBLICATIONS

Anonymous: "Stochastic matrix Wikipedia", Jun. 14, 2024, pp. 1-7, XP093251517, Retrieved from the Internet: https://en.wikipedia.org/w/index.php?title=Stochastic_matrix&oldid=1228929591.

* cited by examiner

| | RUH 1 | RUH 2 | RUH3 | ... | RUH N |
|---|---|---|---|---|---|
| Data Attribute Set 1 | 0.2 | 0.2 | 0.1 | ... | 0.1 |
| Data Attribute Set 2 | 0.3 | 0 | 0 | ... | 0.15 |
| ⋮ | ⋱ | ⋱ | ⋱ | ⋱ | ⋮ |
| Data Attribute Set M | 0.1 | 0.25 | 0 | ... | 0.1 |

FIG. 1b

| | RUH 1 | RUH 2 |
|---|---|---|
| Data Attribute Set 1 | 0.5 i.e. (2/4) | 0.5 i.e. (2/4) |
| Data Attribute Set 2 | 0.2 | 0.8 |

FIG. 1c

| | RUH 1 | RUH 2 |
|---|---|---|
| Data Attribute Set 1 | 0.25 i.e. (1/4) | 0.75 i.e. (3/4) |
| Data Attribute Set 2 | 0.2 | 0.8 |

FIG. 1d

METHOD AND SYSTEM FOR DATA SEGREGATION IN STORAGE DEVICES USING LONGEVITY-HINT BASED STORAGE PROTOCOLS

This U.S. non-provisional application claims the benefit of priority under 35 U.S.C. 119 from Indian Patent Application number 202441048594, filed on Jun. 25, 2024 in the Indian Intellectual Property Office, the entire contents of which are herein incorporated by reference.

TECHNICAL FIELD

The present subject matter is related in general to the field of data storage, more particularly, but not exclusively to a method and a system for performing data segregation in storage devices using longevity-hint based storage protocols.

BACKGROUND

Data placement technologies in Solid State Drives (SSD) try to solve Write Amplification Factor (WAF) problems of SSDs related to the inherent Garbage Collection (GC) processes inside SSDs. Some of the examples of these technologies are Zoned Namespace (ZNS), Flexible Data Placement (FDP), Multi-stream, etc. These technologies generally rely on a longevity hint (also, referred as directive specifiers) sent from a host system to the connected storage device. These hints are used for data segregation in the storage device in a way to minimize the WAF and latencies due to GC. However, a key challenge that still remains while using any of these technologies is the correctness of this hint, for example, 'how an effective hint can be generated from the host system', so that the host system will be able to control the placement of data inside the storage device.

The information disclosed in this background of the disclosure section is only for enhancement of understanding of the general background of the inventions and should not be taken as an acknowledgement or any form of suggestion that this information forms the prior art already known to a person of ordinary skill in the art.

SUMMARY

In some example embodiments, the present disclosure relates to methods for performing data segregation in a storage device. The method includes receiving, by the storage device, an Input-Output (I-O) from a host system. The I-O includes information on data placement by the host system in a placement handle of a plurality of placement handles of the storage device. Determining, by the storage device, whether an overwrite count of the data of the I-O placed by the host system in the placement handle is different from an average overwrite count of data in the placement handle of the storage device upon receiving the I-O. Grouping, by the storage device, one or more pages corresponding to the data of the I-O placed by the host system in the placement handle to another placement handle of the plurality of placement handles that matches the overwrite count of the data of the I-O placed by the host system based on the determination of the overwrite count of the data of the I-O placed by the host system in the placement handle being different from the average overwrite count of data in the placement handle of the storage device during an internal operation. Updating, by the storage device, a log page to record the grouping of the one or more pages.

In some example embodiments, the present disclosure relates to systems for performing data segregation in a storage device, wherein the system includes the storage device. The storage device is configured to receive an Input-Output (I-O) from a host system. The I-O also includes information on data placement by the host system in a placement handle of a plurality of placement handles of the storage device. The storage device is configured to determine whether an overwrite count of the data of the I-O placed by the host system in the placement handle is different from an average overwrite count of data in the placement handle of the storage device upon receiving the I-O. The storage device is configured to group one or more pages corresponding to the data of the I-O placed by the host system in the placement handle to another placement handle of the plurality of placement handles that matches the overwrite count of the data of the I-O placed by the host system determination of the overwrite count of the data of the I-O placed by the host system in the placement handle being different from the average overwrite count of data in the placement handle of the storage device during an internal operation. The storage device is configured to update a log page to record the grouping of the one or more pages.

The foregoing summary is illustrative only and is not intended to be in any way limiting. In addition to the illustrative aspects, embodiments, and features described above, further aspects, embodiments, and features will become apparent by reference to the drawings and the following detailed description.

BRIEF DESCRIPTION OF THE DRAWINGS

The accompanying drawings, which are incorporated in and constitute a part of this disclosure, illustrate some example embodiments and together with the description, serve to explain the disclosed principles. In the figures, the left-most digit(s) of a reference number identifies the figure in which the reference number first appears. The same numbers are used throughout the figures to reference like features and components. Some example embodiments of device and/or methods in accordance with embodiments of the present subject matter are now described below, by way of example only, and with reference to the accompanying figures.

FIG. 1*b* to FIG. 1*d* illustrate examples of the probability matrix in accordance with some example embodiments of the present disclosure.

Figure 1A:
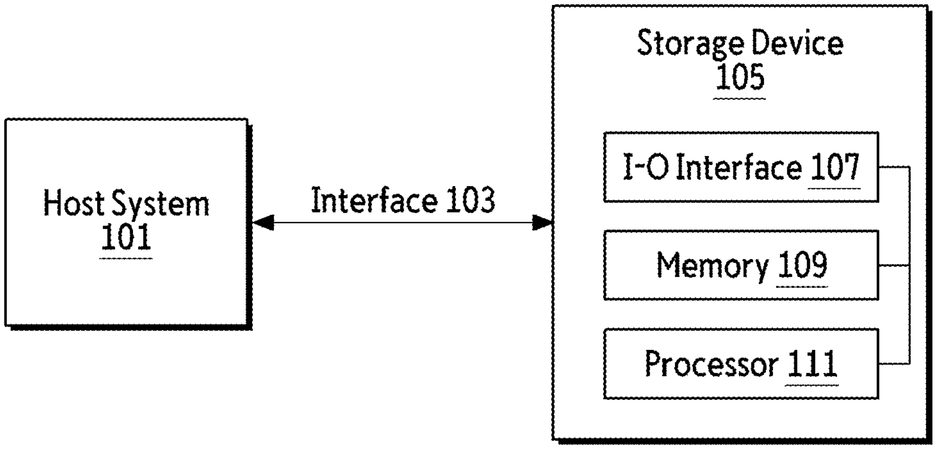
FIG. 1A illustrates an environment for performing data segregation in a storage device in accordance with some example embodiments of the present disclosure.

It should be appreciated by those of ordinary skill in the art that any block diagrams herein represent conceptual views of illustrative systems embodying the principles of the present subject matter. Similarly, it will be appreciated that any flowcharts, flow diagrams, state transition diagrams, pseudo code, and the like represent various processes which may be substantially represented in computer readable medium and executed by a computer or processor, whether or not such computer or processor is explicitly shown.

DETAILED DESCRIPTION

While the disclosure is susceptible to various modifications and alternative forms, specific embodiments thereof have been shown by way of example in the drawings and will be described in detail below. It should be understood, however that it is not intended to limit the disclosure to the particular forms disclosed, but on the contrary, the disclosure is to cover all modifications, equivalents, and alternatives falling within the scope of the disclosure.

The terms "comprises", "comprising", or any other variations thereof, are intended to cover a non-exclusive inclusion, such that a system, device, non-transitory computer readable medium, and/or method that comprises a list of components or operations does not include only those components or operations but may include other components or operations not expressly listed or inherent to such setup or device or method. In other words, one or more elements in a system or apparatus proceeded by "comprises . . . a" does not, without more constraints, preclude the existence of other elements and/or additional elements in the system or method.

In the following detailed description of some example embodiments of the disclosure, reference is made to the accompanying drawings that form a part hereof, and in which are shown by way of illustration specific embodiments in which the disclosure may be practiced. These example embodiments are described in sufficient detail to enable those of ordinary skill in the art to practice the disclosure, and it is to be understood that other embodiments may be utilized and that changes may be made without departing from the scope of the present disclosure. The following description is, therefore, not to be taken in a limiting sense.

In some example embodiments, the hint refers to directive or protocol and the longevity-hint based storage protocols refers to directive or protocol based on longevity pattern (also, referred as overwrite pattern or overwrite count) of data. For example, the placement handle of the storage device 105 may refer to a Reclaim Unit Handle (RUH) of the storage device 105.

FIG. 1*a* illustrates an environment for performing data segregation in a storage device in accordance with some example embodiments of the present disclosure.

In FIG. 1*a*, the environment includes a host system (also, referred as a host) 101, an interface 103 and a storage device 105. The host system 101 can be a computer, a laptop, a mobile device, an embedded device, or any computing device. The host system 101 is connected to the storage device 105 via the interface 103. The interface 103 may be a wired communication.

In some example embodiments, the storage device 105 is a NAND based device. The NAND based device may be one of an embedded MultiMediaCard (eMMC), a Secure Digital (SD) card, a Universal Flash Storage (UFS), and a Solid State Drive (SSD). The storage device 105 includes an Input-Output (I-O) interface 107 (for example, a communication interface), a memory 109, and a processor (or, for example, a controller) 111. For example, the storage device 105 may include a controller. The I-O interface 107 is configured to receive an I-O (also, referred as I-O request) from the host system 101. The I-O (or I-O request) is a data write request or a data read request. In some example embodiments, I-O comprises information on data placement by the host system 101 in a placement handle of a plurality of placement handles of the storage device 105. For instance, the I-O may comprise of data, placement handle, a logical block address of the data, and size of the data. The I-O interface 107 employs a wired communication protocol/method.

The memory 109 is communicatively coupled to the processor 111 of the storage device 105. The memory 109, also, stores controller-executable instructions which may cause the processor 111 to execute the instructions for performing data segregation in the storage device 105. The memory 109 includes, without limitation, memory drives, removable disc drives, etc.

The processor 111 includes at least one data processor for performing data segregation in the storage device 105. The processor 111 may include specialized processing units such as integrated system (bus) controllers, memory management control units, floating point units, graphics processing units, digital signal processing units, etc.

Hereinafter, the operation for performing data segregation in the storage device 105 using longevity-hint based storage protocols is explained in two parts. The first part relates to the operations performed by the storage device 105, wherein the storage device 105 analyses and corrects the data placement done by the host system 101 based on an overwrite count of the data. This first part of the operations may be regarded as a data separation operation. The second part relates to the operations performed by the host system 101, wherein the host system 101 obtains the correction performed by the storage device 105 and uses the information for subsequent placement of new data. This second part of the operations may be regarded as a data placement operation.

In some example embodiments, relating to the first part, prior to receiving the I-O by the storage device 105, the host system 101 assigns a placement handle of a plurality of placement handles of the storage device 105 to the I-O. Thereafter, the storage device 105 receives an I-O from the host system 101. The I-O comprises information on data placement by the host system in a placement handle of a plurality of placement handles of the storage device. For instance, the I-O may comprise data, a placement handle, a logical block address of the data, and size of the data. Upon receiving the I-O, the storage device 105 determines whether an overwrite count (also, referred as overwrite pattern) of the data placed by the host system 101 in the placement handle is different from an average overwrite count of data in the placement handle of the storage device 105. For example, in some example embodiments the data placed by the host system 101 in the placement handle of the plurality of placement handles of the storage device 105 has a different overwrite count (for example, overwrite pattern or longevity pattern) compared to other data in this placement handle, such as, different from an average overwrite count of data in the placement handle of the storage device 105. The storage device 105 detects this abnormal data during Garbage Collection (GC), which may be performed as an internal process or an external process to the storage device 105. In this case, the storage device 105 moves this abnormal data to the appropriate placement handle of the storage device 105 based on overwrite count. The storage device 105 detects this abnormal data by checking each page associated with the data with the overwrite count compared to other pages in the same placement handle. For example, if one page is valid out of 128 pages in a block, then that one page (and data) would have a different overwrite count. In detail, during the GC (for example, as an internal process), the storage device 105 groups one or more pages corresponding to the data placed by the host system 101 in the placement handle to another placement handle of the plurality of placement handles (within the storage device 105) that matches the overwrite count of the data placed by the host system 101 based on the determination. Subsequently, the storage device 105 updates a log page to record the grouping of the one or more pages. This log page is maintained by the storage device 105 and is read or accessed by the host system 101. The log page comprises at least one of an updated logical block address of the data, a size of the data, and a hotness (also, referred as data that is accessed or used frequently) of the data. In some example embodiments, the host system 101 may maintain some or all of the log page.

In some example embodiments, relating to the second part, upon updating of the log page by the storage device 105, the host system 101 polls for the log page to read the log page. The host system 101 reads the log page based on polling. Thereafter, the host system 101 generates a probability matrix based on data attributes and information present in the log page (in the storage device 105). The data attributes comprise at least one of a module identifier of an application, an average input-output size, an average overwrite rate, an average block size, a read-write ratio, and sequentiality of input-output access. The (information present in the) log page comprises at least one of an updated logical block address of the data, a size of the data, and a hotness of the data. A probability matrix module of the host system 101 generates the probability matrix based on data attributes and information present in the log page in the storage device 105. In detail, the host system 101 generates or builds the probability matrix based on an observed (or, alternatively, determined or selected) pattern, for example, data attributes (along y-axis) versus information on the log page (along x-axis), which indicates how one or more pages corresponding to the data is eventually grouped in the placement handle. An example of the probability matrix is shown in FIG. 1*b*. In FIG. 1*b*, the RUH refers to placement handle of the storage device 105. Each row of the probability matrix sums up to 1. The probabilities get updated by the host system 101 as and when the log page is read by the host system 101 for example, the host system 101 updates the probability matrix based on data attributes (also, referred as data attribute set) and information present in the log page. When the probability matrix is generated or built (or, alternatively, determined or selected) initially by the host system 101, all initial probabilities are equal among all the RUHs (for example, placement handles) available. As the storage device 105 updates the log page to record the grouping of the one or more pages to different RUHs, the host system 101 updates the probability matrix. This increases the accuracy of the probability matrix. As the placement handle (placed by the host system 101) changes to another placement handle based on the overwrite count of the data, the host system 101 updates probabilities to incorporate the correlation of data attributes with the changed placement handle. The host system 101 associates the data attributes with the changed placement handle to generate or build the probability matrix. Based on the probability matrix, the host system 101 decides that the higher the probability of a placement handle to a set of data attributes, the more likely that, data with similar attributes will be placed in that placement handle. For a given incoming data, the host system 101 checks the probability matrix, and decides upon the placement handle. The placement handle with the highest probability is selected for incoming data based on probabilities presently associated to data attributes of the incoming data. Based on the probability matrix, the host system 101 places new data in one of the plurality of placement handles of the storage device 105. The reading the log page and updating the probability matrix by the host system 101 serves as feedback loop to improve an accuracy of data placement. In some example embodiments, when a page related to data attribute set 1 has been moved from RUH 1 to RUH 2 as per the log page, FIG. 1*c* illustrates the probability matrix before updating by the host system 101 and FIG. 1*d* illustrates the probability matrix after updating by the host system 101.

Figure 2A:
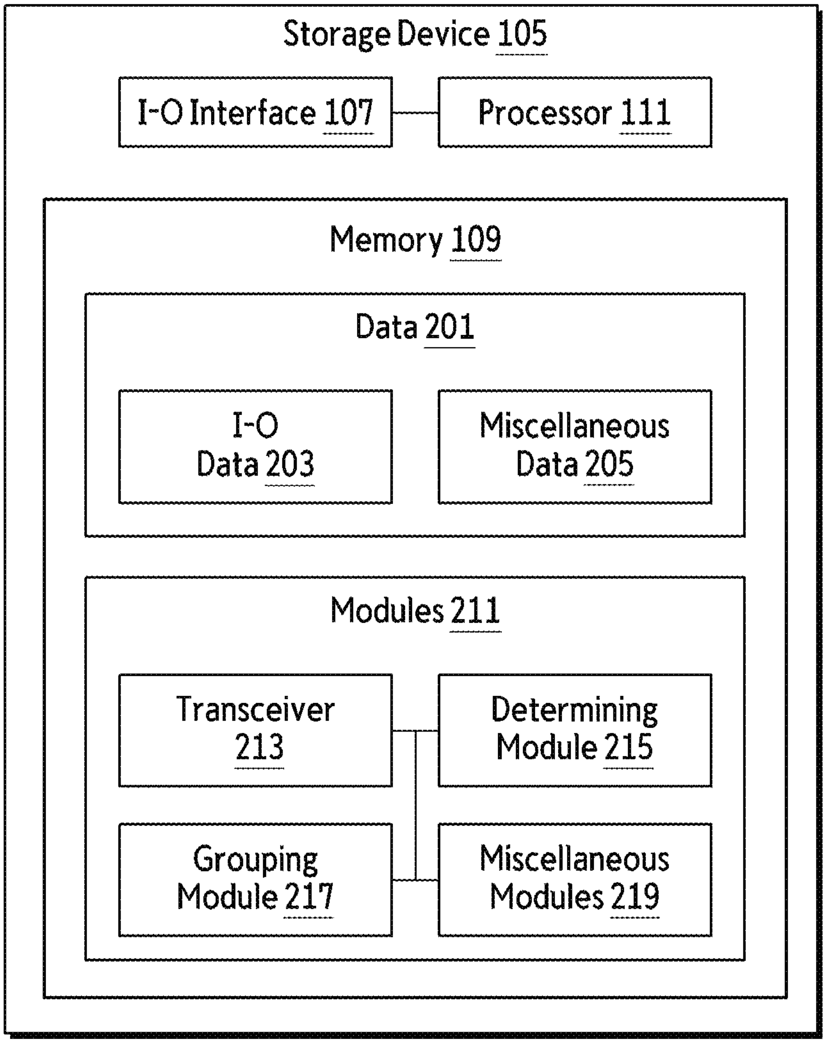
FIG. 2A shows a detailed block diagram of a storage device for performing data segregation in accordance with some example embodiments of the present disclosure.

FIG. 2*a* shows a detailed block diagram of a storage device for performing data segregation in accordance with some example embodiments of the present disclosure.

The storage device 105, in addition to the I-O interface 107 and the processor 111 described above, includes data 201 and one or more modules 211, which are described herein in detail. In some example embodiments, the data 201 is stored within the memory 109 (for example within a memory array). The data 201 may include, for example, I-O data 203 and miscellaneous data 205.

The I-O data 203 includes information on data placement by the host system 101 in a placement handle of a plurality of placement handles of the storage device 105.

The miscellaneous data 205 may include data, including at least one of meta data, user data, and temporary files, generated by one or more modules 211 for performing the various functions of the storage device 105.

In some example embodiments, the data 201 in the memory 109 are processed by the one or more modules 211 present within the memory 109 of the storage device 105. In some example embodiments, the one or more modules 211 are implemented as dedicated hardware units (for example, circuits or circuitry). As described herein, any electronic devices and/or portions thereof according to any of the example embodiments may include, may be included in, and/or may be implemented by one or more instances of processing circuitry such as hardware including logic circuits; a hardware/software combination such as a processor executing software; or any combination thereof. For example, the processing circuitry more specifically may include, but is not limited to, a central processing unit (CPU), an arithmetic logic unit (ALU), a graphics processing unit (GPU), an application processor (AP), a digital signal processor (DSP), a microcomputer, a field programmable gate array (FPGA), and programmable logic unit, a microprocessor, application-specific integrated circuit (ASIC), a neural network processing unit (NPU), an Electronic Control Unit (ECU), an Image Signal Processor (ISP), and the like. In some example embodiments, the processing circuitry may include a non-transitory computer readable storage device (e.g., a memory), for example a DRAM device, storing a program of instructions, and a processor (e.g., CPU) configured to execute the program of instructions to implement the functionality and/or methods performed by some or all of any devices, systems, modules, units, controllers, circuits, architectures, and/or portions thereof according to any of the example embodiments, and/or any portions thereof.

In some example embodiments, the one or more modules 211 are communicatively coupled to the processor 111 for performing one or more functions of the storage device 105. The said modules 211 when configured with the functionality defined in the present disclosure results in a novel hardware. In some example embodiments, the processor 111

(also, referred as controller) include the modules 211. For example, according to some example embodiments, there may be an increase in speed, accuracy, and/or power efficiency of the host device and/or the memory device based on the above methods. Therefore, the improved devices and methods overcome the deficiencies of the conventional devices and methods of managing data, particular related to data placement strategies related to SSDs, etc., while reducing resource consumption, improving data accuracy, and resource allocation (e.g., latency). For example, by reducing WAF according to some example embodiments, the storage device may perform fewer operations, reducing power consumption and improving longevity while providing more consistent access to data. Further, there is an improvement in communication and reliability in the device by providing the abilities disclosed herein.

In some example embodiments, the one or more modules 211 include, but are not limited to, a transceiver 213, a determining module 215, and/or a grouping module 217. The one or more modules 211 may further include miscellaneous modules 219 to perform various miscellaneous functionalities of the storage device 105.

In some example embodiments, the transceiver 213 may receive an Input-Output (I-O) from the host system 101.

In some example embodiments, the determining module 215, upon the transceiver 213 receiving the I-O from the host system 101, the determining module 215 determines whether an overwrite count of the data placed by the host system 101 in the placement handle is different from an average overwrite count of data in the placement handle of the storage device 105.

In some example embodiments, the grouping module 217 may groups one or more pages corresponding to the data placed by the host system 101 in the placement handle to another placement handle of the plurality of placement handles that matches the overwrite count of the data placed by the host system 101 based on the determination during an internal operation. Thereafter, the grouping module 217 updates a log page to record the grouping of the one or more pages. The log page comprises at least one of an updated logical block address of the data, a size of the data, and hotness of the data.

Figure 2B:
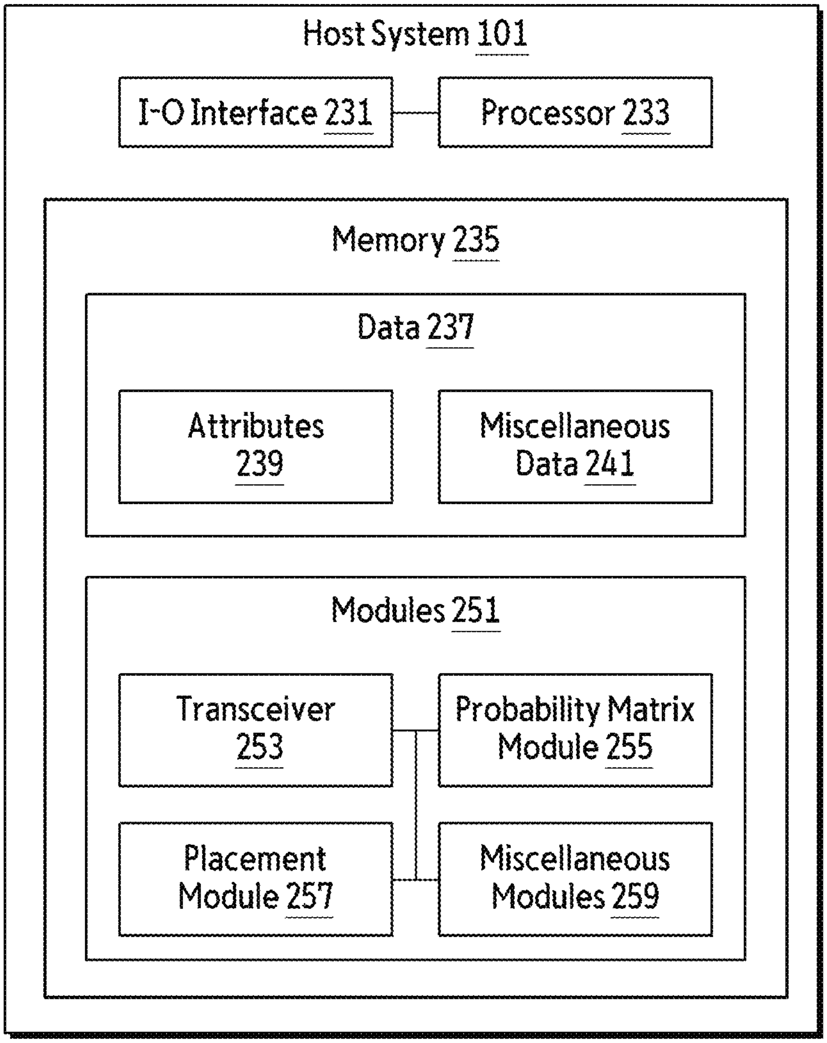
FIG. 2B shows a detailed block diagram of a host system for performing data segregation in accordance with some example embodiments of the present disclosure.

FIG. 2*b* shows a detailed block diagram of a host system for performing data segregation in accordance with some example embodiments of the present disclosure.

The host system 101 includes an I-O interface 231 (for example, a communication interface), a memory 235, and a processor (or, for example, a controller) 233. The I-O interface 231 is configured to receive a notification, from the storage device 105, on the updating of the log page for performing data segregation in the storage device 105. The I-O interface 231 employs a wired communication protocol/method.

The memory 235 is communicatively coupled to the processor 233 of the host system 101. The memory 235, also, stores controller-executable instructions which cause the processor 233 to execute the instructions for performing data segregation in the storage device 105. The memory 235 includes, without limitation, memory drives, removable disc drives, etc.

The processor 233 includes at least one data processor for performing data segregation in the storage device 105. The processor 233 includes specialized processing units such as integrated system (bus) controllers, memory management control units, floating point units, graphics processing units, digital signal processing units, etc.

The host system 101, in addition to the I-O interface 231 and the processor 233 described above, includes data 237 and one or more modules 251. In some example embodiments, the data 237 is stored within the memory 235. The data 237 include, for example, attributes 239 and miscellaneous data 241.

The attributes 239 includes at least one of a module identifier of an application, an average input-output size, an average overwrite rate, an average block size, a read-write ratio, and sequentiality of input-output access. The module identifier refers to a client or tenant identifier. The client or tenant identified is a unique identifier to distinguish various clients or modules. The read-write ratio characterizes a mix of read I-Os to write I-Os for a workload, for example, a ratio of percentage of read I-Os to percentage of write I-Os. The average block size refers to an average size of the read or write request used to communicate with the storage device 105. The sequentiality of input-output access characterises how much of the clients or applications requests occur in a sequential fashion, for example, a ratio of sequential requests compared to non-sequential requests. If the sequentiality is low, for example, it means the workload is highly random. The average overwrite rate refers to how many times a same block is updated in an interval of time.

The miscellaneous data 241 stores data, including at least meta data, user data, and temporary files, generated by one or more modules 251 for performing the various functions of the host system 101.

In some example embodiments, the data 237 in the memory 235 are processed by the one or more modules 251 present within the memory 235 of the host system 101. In some example embodiments, the one or more modules 251 are implemented as dedicated hardware units (for example, circuits, circuitry and/or the like). As used herein, the term module refers to, for example, an Application Specific Integrated Circuit (ASIC), an electronic circuit, a Field-Programmable Gate A Arrays (FPGA), Programmable System-on-Chip (PSoC), a combinational logic circuit, and/or other suitable components that provide the described functionality. In some example embodiments, the one or more modules 251 are communicatively coupled to the processor 233 for performing one or more functions of the host system 101. The said modules 251 when configured with the functionality defined in the present disclosure results in a novel hardware. In some example embodiments, the processor 233 (also, referred as controller) include the modules 251.

In some example embodiments, the one or more modules 251 include, but are not limited to, a transceiver 253, a probability matrix module 255, and a placement module 257. The one or more modules 251, also, includes miscellaneous modules 259 to perform various miscellaneous functionalities of the host system 101.

In some example embodiments, the transceiver 253 transmits the I-O to the storage device 105. The I-O comprises information on data placement by the host system 101 in a placement handle of a plurality of placement handles of the storage device 105. The information on data placement comprises at least one of a logical block address of the data, and size of the data. The logical block address of data refers to an address to access data, for example, from the memory device 105 (for example, an SSD or other storage device) in terms of, for example, a memory array (e.g., in blocks). The size of the data refers to minimum granularity of access from the memory device 105 (for example, an SSD). For example, the size of the data may be, but is not limited to, 4096 or 512 bytes.

In some example embodiments, the probability matrix module 255, upon updating the log page by the storage device 105, the host system 101 polls for the log page to read. The host system 101 reads the log page based on polling. Thereafter, the probability matrix module 255 generates a probability matrix based on data attributes and information present in the log page. The data attributes comprise at least one of a module identifier of an application, an average input-output size, an average overwrite rate, an average block size, a read-write ratio, and sequentiality of input-output access. The (information present in the) log page comprises at least one of an updated logical block address of the data, a size of the data, and hotness of the data. In detail, the probability matrix module 255 generates or builds the probability matrix based on an observed (or, alternatively, determined or selected) pattern for example, data attributes (along y-axis) versus information on the log page (along x-axis), which indicates how one or more pages corresponding to the data is eventually grouped in the placement handle. An example of the probability matrix is shown in FIG. 1*b*. In FIG. 1*b*, the RUH refers to placement handle of the storage device 105. Each row of the probability matrix sums up to 1. The probabilities get updated by the probability matrix module 255 as and when the log page is read by the host system 101 for example, the probability matrix module 255 updates the probability matrix based on data attributes (also, referred as data attribute set) and information present in the log page. When the probability matrix is generated or built (or, alternatively, determined or selected) initially by the probability matrix module 255, all initial probabilities are either zero or equal among all the RUHs (for example, placement handles) available. As the storage device 105 updates the log page to record the grouping of the one or more pages to different RUHs, the probability matrix module 255 updates the probability matrix. This increases the accuracy of the probability matrix. As the placement handle (placed by the host system 101) changes to another placement handle based on the overwrite count of the data, the probability matrix module 255 updates probabilities to incorporate the correlation of data attributes with the changed placement handle. The probability matrix module 255 associates the data attributes with the changed placement handle to generate or build the probability matrix. Based on the probability matrix, the probability matrix module 255 decides that the higher the probability of a placement handle to a set of data attributes, the more likely that, data with similar attributes will be placed in that placement handle. For a given incoming data, the probability matrix module 255 checks the probability matrix, and decides upon the placement handle. The placement handle with the highest probability is selected for incoming data that already has some probabilities associated to its data attributes.

In some example embodiments, the placement module 257, prior to sending the I-O to the storage device 105, may place the data in the placement handle of the plurality of placement handles of the storage device 105. The placement module 257 places new data in one of the plurality of placement handles of the storage device 105 based on the probability matrix generated by the probability matrix module 255.

Figure 3:
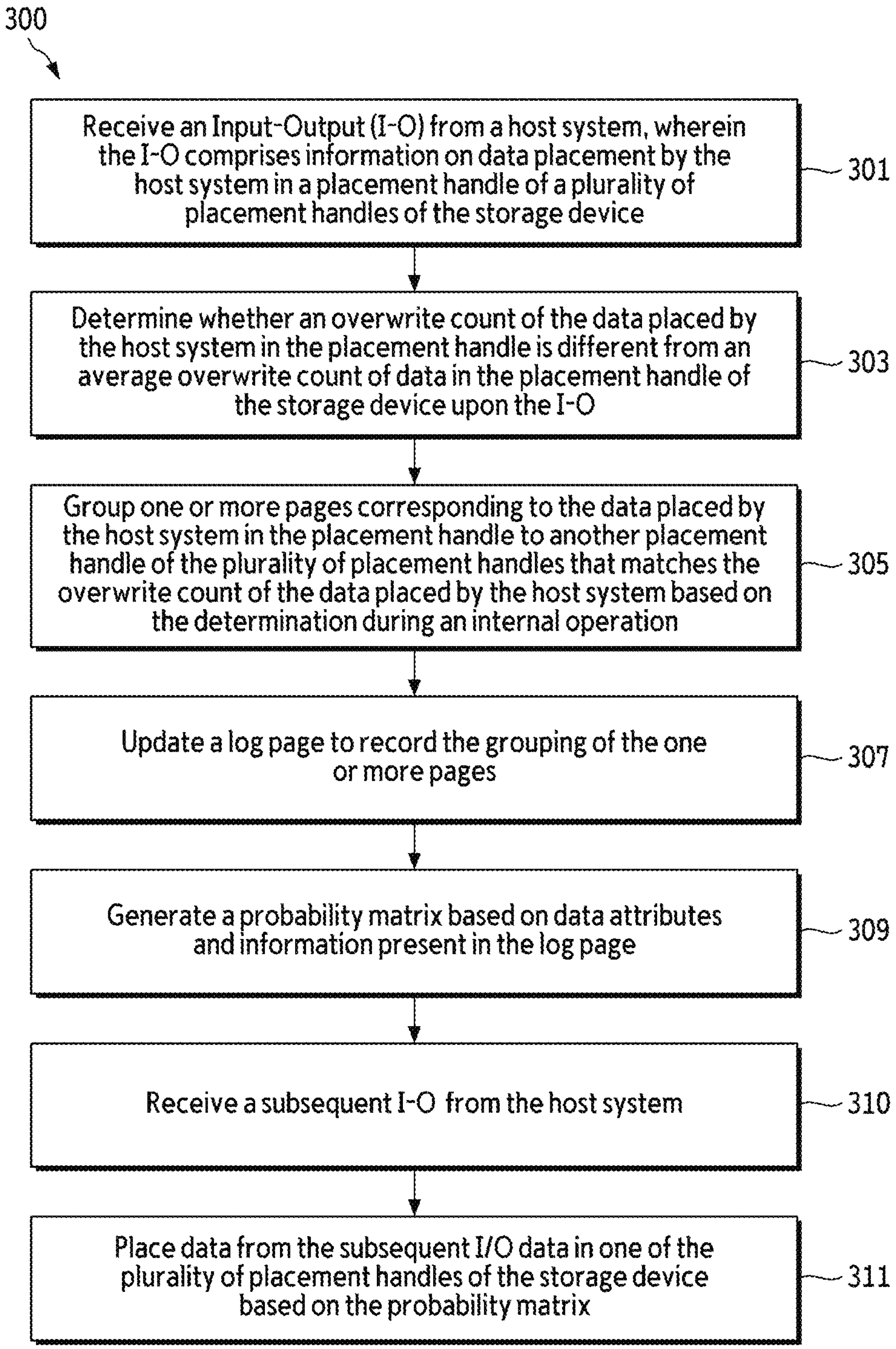
FIG. 3 illustrates a flowchart showing a method for performing data segregation in a storage device in accordance with some example embodiments of the present disclosure.

FIG. 3 illustrates a flowchart showing a method for performing data segregation in a storage device in accordance with some example embodiments of the present disclosure.

As illustrated in FIG. 3, the method 300 includes operations for performing data segregation in a storage device. The method 300 may be described in the general context of computer executable instructions. Generally, computer executable instructions can include routines, programs, objects, components, data structures, procedures, units, and/or functions, which perform particular functions or implement particular abstract data types.

The order in which the method 300 is described is not intended to be construed as a limitation, and any number of the described method operations can be combined in any order to implement the method. Additionally, individual operations may be deleted from the methods without departing from the scope of the subject matter described herein. Furthermore, the method can be implemented in any suitable hardware, software, firmware, or combination thereof.

At operation 301, the transceiver 213 of the storage device 105 receives I-O from the host system 101. The I-O comprises information on data placement by the host system 101 in a placement handle of a plurality of placement handles of the storage device 105.

At operation 303, the determining module 215 of the storage device 105 determines whether an overwrite count of the data placed by the host system 101 in the placement handle is different from an average overwrite count of data in the placement handle of the storage device 105 upon receiving the I-O.

At operation 305, the grouping module 217 of the storage device 105 groups one or more pages corresponding to the data placed by the host system 101 in the placement handle to another placement handle of the plurality of placement handles that matches the overwrite count of the data placed by the host system 101 based on the determination during an internal operation.

At operation 307, the grouping module 217 of the storage device 105 updates a log page to record the grouping of the one or more pages. The log page comprises at least one of an updated logical block address of the data, a size of the data, and hotness of the data.

At operation 309, the probability matrix module 255 of the host system 101 generates a probability matrix based on data attributes and information present in the log page. The data attributes comprise at least one of a module identifier of an application, an average input-output size, an average overwrite rate, an average block size, a read-write ratio, and sequentiality of input-output access. The information present in the log page comprises at least one an updated logical block address of the data, a size of the data, and hotness of the data.

As operation 310, the transceiver 213 of the storage device 105 receives a subsequent I-O from the host system 101. The subsequent I-O comprises information on data placement by the host system 101 in a placement handle of a plurality of placement handles of the storage device 105.

At operation 311, the placement module 257 of the host system 101 places data from the subsequent I-O in one of the plurality of placement handles of the storage device 105 based on the probability matrix.

Some technical advantages of the present disclosure are given below:

The present disclosure improves upon conventional methods by using a host-device (for example, host system-storage device) co-ordinated approach for example, using the storage device assisted method to eventually arrive at a right longevity hint instead of trying to generate a longevity hint from the host system. For example, according to some example embodiments, there may be an increase in speed, accuracy, and/or power efficiency of the host device and/or the memory device based on the above methods. Therefore, the improved devices and methods overcome the deficiencies of the conventional devices and methods of managing data, particular related to data placement strategies related to SSDs, etc., while reducing resource consumption, improving data accuracy, and resource allocation (e.g., latency). For example, by reducing WAF according to some example embodiments, the storage device may perform fewer operations, reducing power consumption and improving longevity while providing more consistent access to data. Further, there is an improvement in communication and reliability in the device by providing the abilities disclosed herein.

The approach presented in the present disclosure is applicable to most of the data placement technologies including FDP, Stream or Multi-stream, smart FTL, and/or Flexible Data Placement (FDP) except for ZNS.

The approach presented in the present disclosure provides low WAF in storage devices, thereby, reducing the Total Cost of Ownership (TCO) significantly for customers, as well as improved performance, reliability, and speed.

The reading of the log page and updating the probability matrix by the host system 101 of the present disclosure serves as feedback loop to improve accuracy and reliability of placement of data.

Some of the clauses are mentioned below.

[1]: A method for performing data segregation in a storage device, comprising:
- receiving, by the storage device, an Input-Output (I-O) from a host system, the I-O comprising data and information on data placement by the host system in a placement handle of a plurality of placement handles of the storage device;
- determining, by the storage device, whether an overwrite count of the data of the I-O placed by the host system in the placement handle is different from an average overwrite count of data in the placement handle of the storage device upon receiving the I-O;
- grouping, by the storage device, one or more pages corresponding to the data of the I-O placed by the host system in the placement handle to another placement handle of the plurality of placement handles that matches the overwrite count of the data of the I-O placed by the host system based on the determination of the overwrite count of the data of the I-O placed by the host system in the placement handle being different from the average overwrite count of data in the placement handle of the storage device during an internal operation; and updating, by the storage device, a log page to record the grouping of the one or more pages.

[2]: The method as described in [1], further comprising:
- generating, by the host system, a probability matrix based on data attributes and information present in the log page; and
- placing, by the host system controlling the storage device, the data of the I-O in one of the plurality of placement handles of the storage device based on the probability matrix.

[3]: The method as described in [2], wherein the data attributes comprise at least one of a module identifier of an application, an average input-output size, an average overwrite rate, an average block size, a read-write ratio, and sequentiality of input-output access.

[4]: The method as described in any of [1] to [3], wherein prior to receiving the I-O by the storage device, the method comprising:
- placing, by the host system, the information on data placement in the I-O.

[5]: The method as described in any of [1] to [4], wherein the log page comprises at least one of an updated logical block address of the data, a size of the data, and a hotness of the data.

[6]: The method as described in any of [1] to [5], wherein the information on data placement comprises a logical block address of the data, and size of the data.

[7]: A system for performing data segregation in a storage device, the system comprising:

the storage device configured to:
- receive an Input-Output (I-O) from a host system, the I-O comprises data and information on data placement by the host system in a placement handle of a plurality of placement handles of the storage device;
- determine whether an overwrite count of the data of the I-O placed by the host system in the placement handle is different from an average overwrite count of data in the placement handle of the storage device upon receiving the I-O;
- group one or more pages corresponding to the data of the I-O placed by the host system in the placement handle to another placement handle of the plurality of placement handles that matches the overwrite count of the data of the I-O placed by the host system based on the determination of the overwrite count of the data of the I-O placed by the host system in the placement handle being different from the average overwrite count of data in the placement handle of the storage device during an internal operation; and
- update a log page to record the grouping of the one or more pages.

[8]: The system as described in [7], wherein the system comprising:

the host system communicatively coupled to the storage device, the host system is configured to:
- generate a probability matrix based on data attributes and information present in the log page; and
- control the storage device to place the data of the I-O in one of the plurality of placement handles of the storage device based on the probability matrix.

[9]: The system as described in [8], wherein the data attributes comprise at least one of a module identifier of an application, an average input-output size, an average overwrite rate, an average block size, a read-write ratio, and sequentiality of input-output access.

[10]: The system as described in any of [7] to [9], wherein the host system is configured to:

place information on data placement in the I-O.

[11]: The system as described in any of [7] to [10], wherein the log page comprises at least one of an updated logical block address of the data, a size of the data, and hotness of the data.

[12]: The system as described in any of [7] to [11], wherein the information on data placement comprises a logical block address of the data, and size of the data.

The described operations may be implemented as a method, system or article of manufacture using standard programming and/or engineering techniques to produce software, firmware, hardware, or any combination thereof. The described operations may be implemented as code maintained in a "non-transitory computer readable medium", where a processor may read and execute the code from the computer readable medium. The processor is at least one of a microprocessor and a processor capable of processing and executing the queries. A non-transitory computer readable medium may include media such as magnetic storage medium (for example, hard disk drives, floppy disks, tape, etc.), optical storage (CD-ROMs, DVDs, optical disks, etc.), volatile and non-volatile memory devices (for example, EEPROMs, ROMS, PROMs, RAMs, DRAMs, SRAMs, Flash Memory, firmware, programmable logic, etc.), etc. Further, non-transitory computer-readable media include all computer-readable media except for a transitory. The code implementing the described operations may further be implemented in hardware logic (for example, an integrated circuit chip, Programmable Gate Array (PGA), Application Specific Integrated Circuit (ASIC), etc.).

The terms "including", "comprising", "having" and variations thereof mean "including but not limited to", unless expressly specified otherwise.

The enumerated listing of items does not imply that any or all of the items are mutually exclusive, unless expressly specified otherwise.

The terms "a", "an" and "the" mean "one or more", unless expressly specified otherwise.

A description of some example embodiments with several components in communication with each other does not imply that all such components are required. On the contrary, a variety of optional components are described to illustrate the wide variety of possible embodiments of the invention.

When a single device or article is described herein, it will be readily apparent that more than one device/article (whether or not they cooperate) may be used in place of a single device/article. Similarly, where more than one device or article is described herein (whether or not they cooperate), it will be readily apparent that a single device/article may be used in place of the more than one device or article or a different number of devices/articles may be used instead of the shown number of devices or programs. The functionality and/or the features of a device may be alternatively embodied by one or more other devices which are not explicitly described as having such functionality/features. Thus, other embodiments of the invention need not include the device itself.

The illustrated operations of FIG. 3 show certain events occurring in a certain order. In alternative example embodiments, certain operations may be performed in a different order, modified or removed. Moreover, operations may be added to the above-described logic and still conform to the described example embodiments. Further, operations described herein may occur sequentially or certain operations may be processed in parallel. Yet further, operations may be performed by a single processing unit or by distributed processing units.

Finally, the language used in the specification has been principally selected for readability and instructional purposes, and it may not have been selected to delineate or circumscribe the inventive subject matter. It is therefore intended that the scope of the inventions be limited not by this detailed description, but rather by any claims that issue on an application based here on. Accordingly, the disclosure of some example embodiments of the inventions is intended to be illustrative, but not limiting, of the scope of the inventions, which are set forth in the following claims.

While various aspects and embodiments have been disclosed herein, other aspects and embodiments will be apparent to those of ordinary skill in the art. The various aspects and embodiments disclosed herein are for purposes of illustration and are not intended to be limiting, with the true scope being indicated by the following claims.

REFERRAL NUMERALS:

| Reference number | Description |
|---|---|
| 101 | Host system |
| 103 | Interface |
| 105 | Storage device |
| 107, 231 | I-O interface |
| 109, 235 | Memory |
| 111, 233 | Processor |
| 201, 237 | Data |
| 203 | I-O data |
| 205, 241 | Miscellaneous data |
| 211, 251 | Modules |
| 213, 253 | Transceiver |
| 215 | Determining module |
| 217 | Grouping module |
| 219, 259 | Miscellaneous modules |
| 239 | Attributes |
| 255 | Probability matrix module |
| 257 | Placement module |

We claim:

1. A method for performing data segregation in a storage device, comprising:

receiving, by the storage device, an Input-Output (I-O) from a host system, the I-O comprising data and information on data placement by the host system in a placement handle of a plurality of placement handles of the storage device;

determining, by the storage device, whether an overwrite count of the data of the I-O placed by the host system in the placement handle is different from an average overwrite count of data in the placement handle of the storage device upon receiving the I-O;

grouping, by the storage device, one or more pages corresponding to the data of the I-O placed by the host system in the placement handle to another placement handle of the plurality of placement handles that matches the overwrite count of the data of the I-O placed by the host system based on determining that the overwrite count of the data of the I-O placed by the host system in the placement handle being different from the average overwrite count of data in the placement handle of the storage device during an internal operation; and updating, by the storage device, a log page to be read by the host system to record the grouping of the one or more pages as placement feedback for the host system to, based on data attributes in the log page, generate a correlation of the data attributes with the plurality of placement handles and use the correlation to select one or more placement handles of the plurality of placement handles for subsequent I-O data.

2. The method as claimed in claim 1, further comprising:

generating, by the host system, a probability matrix that represents the correlation; and placing, by the host system controlling the storage device, the data of the I-O in one of the plurality of placement handles of the storage device based on the probability matrix.

3. The method as claimed in claim 2, wherein the data attributes comprise at least one of a module identifier of an application, an average input-output size, an average overwrite rate, an average block size, a read-write ratio, and a sequentiality of input-output access.

4. The method as claimed in claim 1, wherein prior to receiving the I-O by the storage device, the method comprising:

placing, by the host system, the information on data placement in the I-O.

5. The method as claimed in claim 1, wherein the log page comprises at least one of an updated logical block address of the data, a size of the data, and a hotness of the data.

6. The method as claimed in claim 1, wherein the information on data placement comprises a logical block address of the data and a size of the data.

7. A system for performing data segregation in a storage device, the system comprising:

a storage device configured to:

receive an Input-Output (I-O) from a host system, the I-O comprising data and information on data placement by the host system in a placement handle of a plurality of placement handles of the storage device;

determine whether an overwrite count of the data of the I-O placed by the host system in the placement handle is different from an average overwrite count of data in the placement handle of the storage device upon receiving the I-O;

group one or more pages corresponding to the data of the I-O placed by the host system in the placement handle to another placement handle of the plurality of placement handles that matches the overwrite count of the data of the I-O placed by the host system based on determining that the overwrite count of the data of the I-O placed by the host system in the placement handle being different from the average overwrite count of data in the placement handle of the storage device during an internal operation; and update a log page to be read by the host system to record the grouping of the one or more pages as placement feedback for the host system to, based on data attributes in the log page, generate a correlation of the data attributes with the plurality of placement handles and use the correlation to select one or more placement handles of the plurality of placement handles for subsequent I-O data.

8. The system as claimed in claim 7, wherein the system comprising:

the host system communicatively coupled to the storage device, the host system is configured to:

generate a probability matrix that represents the correlation; and control the storage device to place the data of the I-O in one of the plurality of placement handles of the storage device based on the probability matrix.

9. The system as claimed in claim 8, wherein the data attributes comprise at least one of a module identifier of an application, an average input-output size, an average overwrite rate, an average block size, a read-write ratio, and a sequentiality of input-output access.

10. The system as claimed in claim 7, wherein the host system is configured to:

place information on data placement in the I-O.

11. The system as claimed in claim 7, wherein the log page comprises at least one of an updated logical block address of the data, a size of the data, and a hotness of the data.

12. The system as claimed in claim 7, wherein the information on data placement comprises a logical block address of the data, and a size of the data.

* * * * *